G. B. GROVER.
FEED MECHANISM FOR DIEING OUT MACHINES.
APPLICATION FILED NOV. 6, 1914.
1,182,474.
Patented May 9, 1916.
3 SHEETS—SHEET 2.
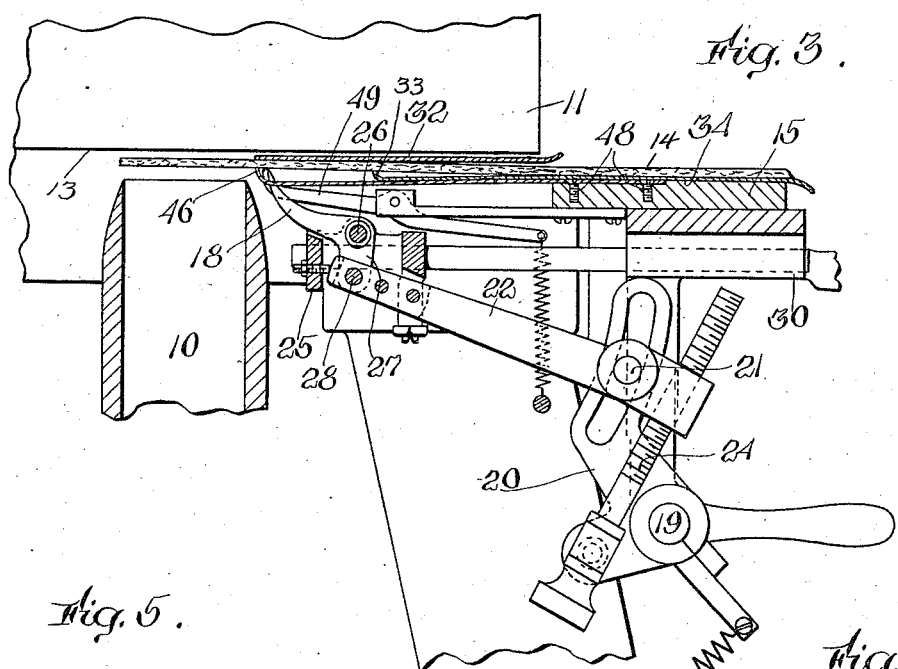
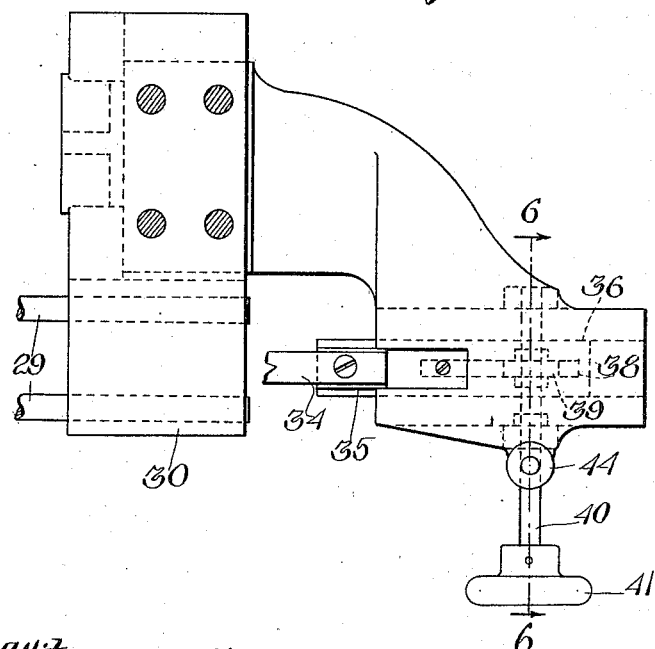
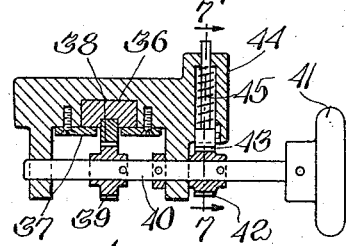
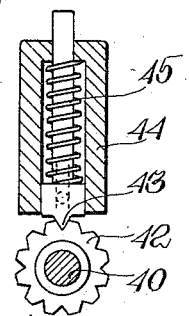
Witnesses:
Inventor:
G. B. Grover
Attys.

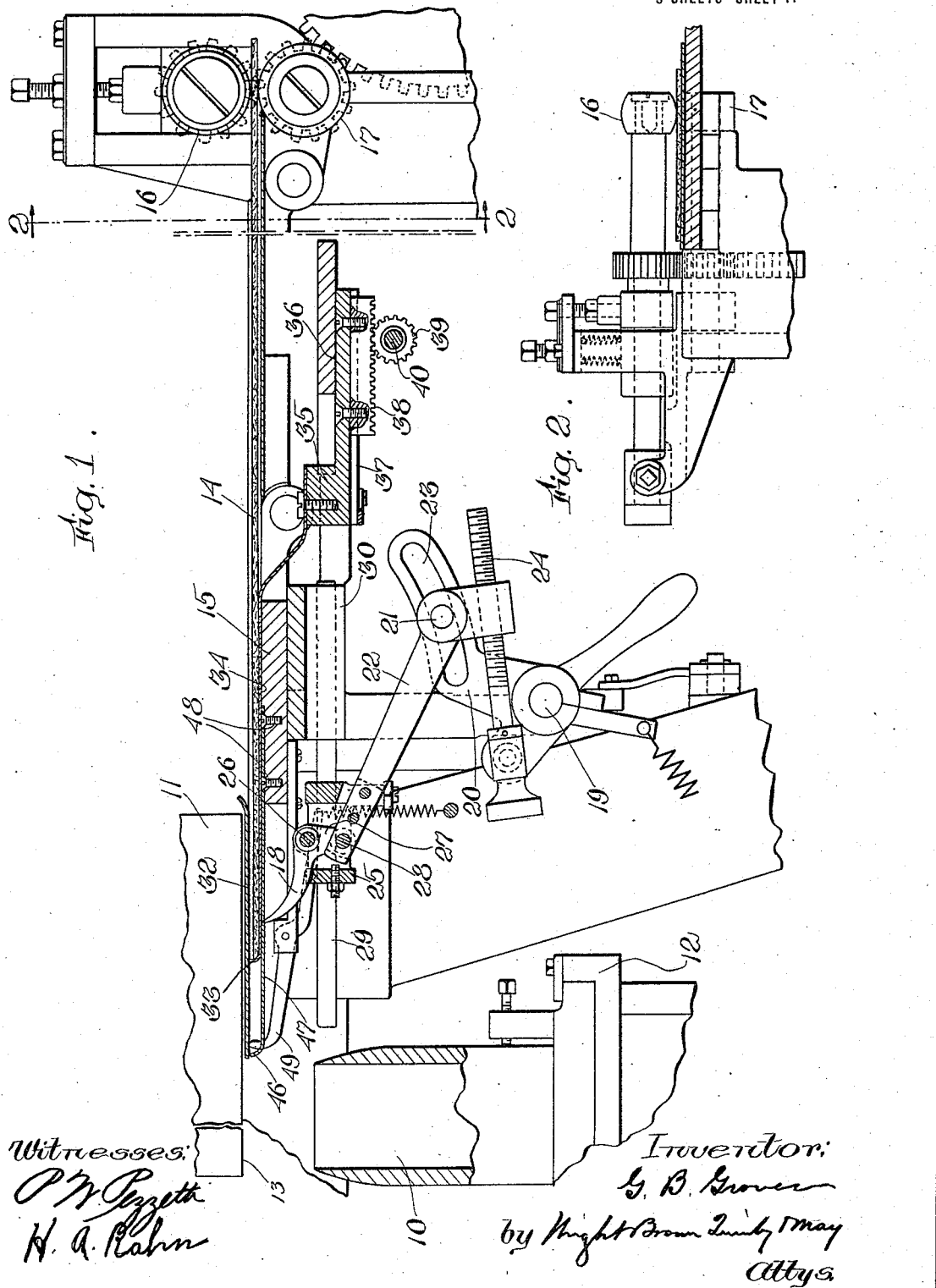

G. B. GROVER.
FEED MECHANISM FOR DIEING OUT MACHINES.
APPLICATION FILED NOV. 6, 1914.
1,182,474.
Patented May 9, 1916.
3 SHEETS—SHEET 3.
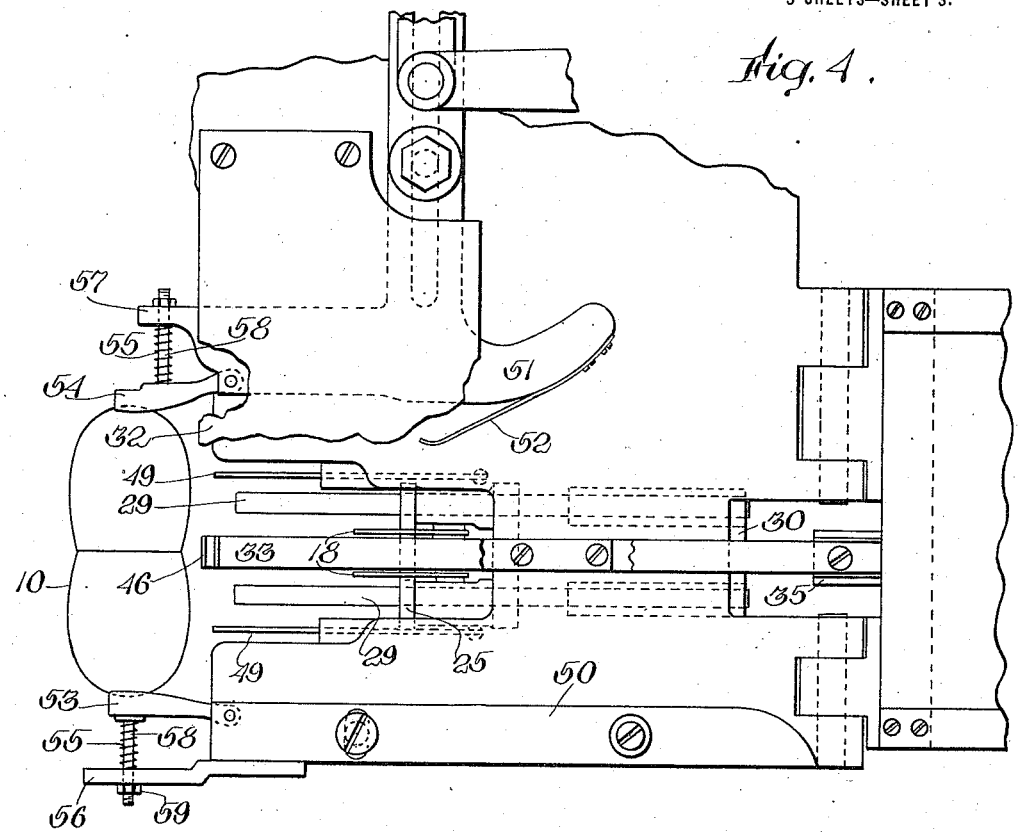
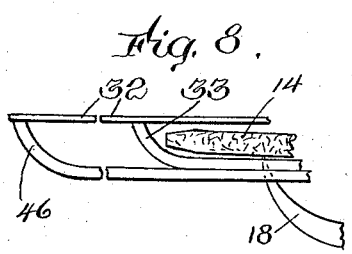
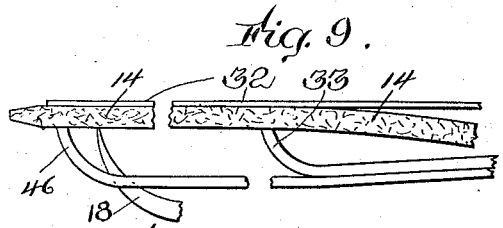
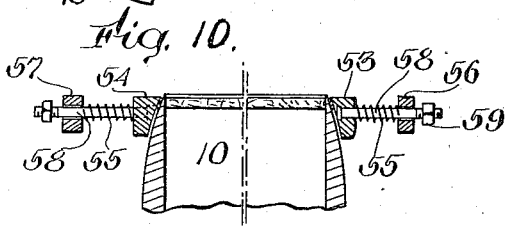
Witnesses:
Inventor:
G. B. Grover

UNITED STATES PATENT OFFICE.

GEORGE B. GROVER, OF LYNN, MASSACHUSETTS, ASSIGNOR TO W. J. YOUNG MACHINERY COMPANY, OF LYNN, MASSACHUSETTS, A CORPORATION OF MASSACHUSETTS.

FEED MECHANISM FOR DIEING-OUT MACHINES.

1,182,474.     Specification of Letters Patent.     Patented May 9, 1916.

Application filed November 6, 1914. Serial No. 870,610.

*To all whom it may concern:*

Be it known that I, GEORGE B. GROVER, a citizen of the United States, and resident of Lynn, in the county of Essex and State of Massachusetts, have invented certain new and useful Improvements in Feed Mechanism for Dieing-Out Machines, of which the following is a specification.

The present invention relates generally to machines for cutting out articles of any description, such for example, as heel lifts, shoe soles, or other articles from sheet material by means of a die, and in which the material is progressively fed to the die between cuts of the latter.

The main object of the invention is to provide, in connection with an intermittently acting feeder, a positioning device for arresting the piece of material or stock about to be cut by the die at a point in such relation to the feeder and to the line of action of the die, that the first operation of the feeder on the piece will carry its advancing end only so far that the die, when making its first cut, will trim off the edge of the piece. It is to be noted that leatherboard, which is the material used for the manufacture of a large proportion of the heels made at the present day, is produced in sheets which are more or less uneven at their ends, such unevenness consisting either in a ragged line at the edge, or less thickness at and near the edge, or in both irregular thickness and irregular outline; and the same thing is true to a certain extent of other materials available for heel lifts and other articles. When heel lifts or other articles are cut by an automatic dieing out machine from sheets of this character close to the extreme ends of the sheets, such articles are either irregular in thickness, or their outlines may be incomplete on account of the ragged edge of the end of the sheet. It is my object in this connection to cause the first action of the die on an advancing piece to cut off the uneven or ragged edge before the piece has been advanced far enough across the line of action of the die for the first complete lift, or other article, to be severed from the piece, so that when finally the cutting of complete articles from the piece commences, such articles will all be as nearly uniform as possible.

Accordingly that part of the invention which has to do with the above stated object consists in a stop or arrester arranged to arrest the advancing piece at such a point short of the limit to which the intermittent feeder is adapted to propel its advancing end, that the first step of the movement given to the piece by such feeder will end when only the ragged or uneven part at the edge of the piece has crossed the line of action of the nearer side of the cutting die; said stop being located at the same side of the die as that from which the piece advances in approaching the die, and being displaceable after having arrested the piece so as to permit subsequent propulsion of the latter by the feeder.

It is also a part of the invention to provide means for adjusting the stop in accordance with the peculiarities of different kinds of material, and of different pieces of the same kind, and according to adjustments of the feeder for a longer or shorter feed, so that the scrap thus cut off from the piece will include only the uneven edge and will not contain any material suitable for finished articles of the sort produced in the machine. In other words, so that there will be no avoidable waste of material in the scrap which must be cut off.

A second object of the invention is to provide an improved intermittent feeder for a dieing out machine.

A third object is to provide centering devices in combination with such dieing out machine for accurately locating the strip or piece of stock in relation to the die, and adapted to be displaced so as not to interfere with the die.

In this specification and the drawings forming a part thereof, I have described and illustrated that embodiment of my invention which is particularly applicable to a machine, such as that shown in my Patent 1,066,727 granted July 8, 1913, in which strips of sheet material which have been fed by continuously acting feeding means past a strip cutter, are further fed by an intermittently acting reciprocating feeder into position to be cut by a die. However, although I have shown this particular embodiment of the invention in connection with the particular machine above identified, I do not intend such showing to be considered as a limitation of the invention, but instead intend the protection for which I here make application to embrace equivalent devices of other constructions, including such as may be applied to other machines of whatever nature, whether such machines are provided with an automatic preliminary feeder or are arranged to have the material brought manually to the point indicated, which embody essentially the functions and principles of operation, and accomplish the results, of the contrivances herein described, and correspond with the spirit of the appended claims.

Figure 1 is a section in the line of feed of the stock of a portion of a dieing out machine to which my invention is applied. Fig. 2 is a cross section on the line 2—2 of Fig. 1 and an elevation at the parts of the right of said line. Fig. 3 is a sectional view showing the secondary feeder and the stock in a different position from that shown in Fig. 1. Fig. 4 is a plan view of the part of a dieing out machine to which my present invention is applied, parts of the machine being broken away. Fig. 5 is a plan view of a detail of the machine. Fig. 6 is a sectional view on line 6—6 of Fig. 5, looking in the direction of the arrow. Fig. 7 is a sectional view on line 7—7 of Fig. 6 looking in the direction of the arrow. Figs. 8, and 9, are detail views illustrating different positions of the stop in which my invention is embodied in relation to the material operated upon. Fig. 10 is a sectional view of a die and centering gages used in connection with the die for centering the sheet material acted upon.

The same reference characters indicate the same parts in all the figures.

Referring to the drawings 10 represents a cutter or die adapted to penetrate sheet material and to sever articles of the desired form therefrom.

11 represents a block for supporting the material against the thrust of the die. Such block is conveniently of wood or other material softer than that of which the die is made so that the cutting edge of the die will not be blunted by coming into contact with the block. It is to be understood that the die is carried by a holder 12 and is moved back and forth toward and away from the surface 13 of the block. I have not shown in these drawings any means for so reciprocating the die, but suitable means for the purpose, which may be used with the machine here illustrated are shown in my prior Patent No. 1,066,727 hereinbefore referred to. I have illustrated the die and cutting block herein in the same relative positions as represented in said patent, but it is to be understood that they may be reversed or otherwise arranged without departing from the spirit of the invention.

The stock or sheet material which is acted upon by the die is shown at 14. This material may be leatherboard or any other material from which heel lifts or other articles are cut, and may be any material whatever having sufficient stiffness to enable it to be fed forward without buckling by pressure applied at a distance back from its advanced end. This material is fed over a table or other support 15 by mechanism which I may term, for the purposes of this invention, a preliminary feeder of feeding means, consisting of complemental rolls 16 and 17 arranged on opposite sides of the strip and pressed together so as to grip the strip between them. Strips or pieces of the sheet material are fed by these feed rolls until the advancing end is within the field of action of the secondary feeder hereinafter described. Said preliminary feeder, however, is no part of the present invention, but is described because it is present in the machine to which the herein illustrated embodiment of the invention is applied. On the contrary such embodiment of the invention does not require an automatic preliminary feeder but performs its function in exactly the same way and with exactly the same effect, when the preliminary feeder is omitted and the stock is brought by hand to the secondary or intermittent feeder now to be described.

The secondary feeder is a finger 18 arranged below the path in which the stock is fed and terminating in a pointed end which is inclined toward and with the direction of feed. Such finger is pivoted upon a stud 26 on a carriage 25, which is mounted to travel on guide rods 29 extending parallel to the line of feed, and the feed finger has an arm 27 jointed by a pivot pin 28 to a connecting rod or bar 22, the opposite end of which is pivoted by a pin 21 with an arm 20 mounted on a rock shaft 19. The rock shaft, arm 20, pivot 21, a screw for adjusting the position of the latter in a slot 23 of the arm, the bar 22, and the means for oscillating the rock shaft, are or may be identical with the corresponding parts fully described and illustrated in my prior Patent 1,066,727 previously referred to, wherefore further descriptions of such parts and of their mode of operation and adjustment is unnecessary herein. It is sufficient to say that oscillation of the rock shaft causes reciprocation of the feed finger and of the carriage 25 whereon the latter is pivoted, and equally causes the pointed end of the feed finger to be forced against the stock during the feeding stroke, and to be withdrawn therefrom during the return stroke, by reason of the pivotal mounting of the feed finger on the carriage and the fact that it is connected to the bar 22 by a crank arm at the opposite side of such pivot from the path of the stock. The feeder and operating means therefor here shown differ from the secondary feeder illustrated in my patent above referred to in the above described mode of mounting and connecting the feed finger, whereby it is given a positive thrust toward the stock on the feeding stroke. A plate 32 extends over the path of the sheet material and under the cutting block to guide the material past the edge of the block and to hold it against the thrust of the feed finger. The particular construction and mounting of the reciprocating feeding device, above described, is one of the features of the invention.

33 represents a stop which crosses the path of feed of the sheet material. Said stop is adjustable in the direction of feeding and is carried by a member 34, which I may call a stop holder. Said member 34 is conveniently a strip of resilient and sufficiently stiff material, such as spring metal, which extends over the support or table 15 and beneath the sheet material 14, and is secured at its rear end to a carriage 35. Preferably the stop 33 is formed by bending up the extreme forward end of the member 34, although it may be otherwise formed. Preferably also said stop extends into contact with the surface of the guide plate 32 so as to be certain to arrest the strip material, but it is somewhat inclined in the feeding direction in order that it may be displaced under a sufficiently strong pressure applied by such sheet material. The carriage 35 is adapted to slide in a guideway 36 in the machine frame, as shown in Fig. 6, being retained in such guideway by holding members 37. Secured to the carriage is a rack 38 in mesh with a pinion 39 on a shaft 40 having a hand wheel 41. Said hand wheel, shaft, pinion, and rack provide a means by which the carriage may be adjusted, and the guideway causes such adjustments to take place in the direction of feeding of the material 14, whereby the stop 33 may be placed at the desired distance from the line of action of the die 10. The adjustments of the carriage and stop are held by a notched wheel 42 on the shaft 40 and a pawl 43 arranged to engage the notches of said wheel. The pawl is preferably constructed and arranged, as shown in Figs. 6 and 7, as a plunger which slides in a socket 44 in a part of the machine frame and is pressed upon by a spring 45 toward the wheel 42. The notches of the wheel and the tooth of the pawl or locking dog 43 are inclined so that the dog may be displaced by the movement of the wheel when sufficient force tending to turn it is applied upon the hand wheel 41.

In addition to the stop 33 there is provided a retainer 46, which may be formed similarly to the stop 33 as the bent up end of a strip of resilient metal, or retainer holder, 47, which is secured to the table 15 by screws or other fastenings 48 and extends under and in contact with the stop holder 34. Both the stop holder and the retainer holder being resilient, are adapted to yield and permit the stop and retainer to be displaced from the plate 32 under the pressure of the advancing end of a strip of stock, and the resistance to yielding of the stop holder is increased by the retainer holder 47, which contacts with and reinforces the stop holder.

The action of the stop and retainer is illustrated in Figs. 8 and 9. The normal position of these parts is that shown in Fig. 8, where the stop and retainer both bear against, or lie close to, the guide plate 32. When the strip of stock is propelled by the feeder 18, it mounts up on the inclined stop and is crowded between the latter and the guide plate, forcing the stop first, and, finally, the retainer away from the guide plate and being itself passed between them, as shown in Fig. 9. Thereafter through the continuation of feeding of the stock, the same is held against the guide plate and close to the face of the cutting block as long as any of the strip remains. Any remnant of the strip large enough to furnish material for a complete lift or other article is also held by the retainer 46, in position to be cut, and is thus prevented from falling away and being either injured by the die or not cut at all.

The stop holder and retainer are made of less width than the strip of stock and the feeder 18 is placed at one side of the holder and retainer so that the latter do not interfere with its operation. If desired, there may be two or more feeders, as here shown, placed on opposite sides of the stop holder and retainer, as shown in Fig. 4, or in any other desired way. In addition I may provide yielding supporting fingers 49 of the sort shown in my prior Patent No. 1,066,727 aforesaid to perform the functions described in said patent.

The strip of stock is guided as to its position laterally of the direction of feeding by edge guides 50 and 51, the latter being equipped with a spring strip 52, which is the portion of the guide 51 to make actual contact with the strip. In addition, the portion of the strip which is in position to be cut is further guided and centrally located over the die by means of dogs 53 and 54 pivoted to the guides 50 and 51, respectively, and extending at opposite sides of the die as shown in Fig. 4. These dogs are pressed toward the die by springs 55 which press against the outer sides of the dogs and react against fingers 56 and 57 secured to the guides 50 and 51, respectively. The springs are guided by rods 58 which pass from the dogs through the fingers and are movable endwise. These rods are provided with adjustable abutments 59 on the outer sides of the fingers, such adjustments being preferably nuts screwed upon the ends of the rods, which limit the approach of the dogs to the die. The faces of the dogs adjacent to the die are inclined or beveled as illustrated in Fig. 10 so that while their upper portions may somewhat overlie the edge of the die, their lower portions are farther apart than the width of the die, allowing the latter to enter between them when making its cutting stroke so as to spread them apart without injury to either the dogs or the die. These dogs insure that the strip, even though not materially wider than the die will be so placed that the edge of the die may not intersect either of the side edges of the strip.

The devices which I have thus described provide means for accurately locating the stock to enable as great as number as possible of perfect articles to be cut with the minimum of waste from a strip having approximately the width of the articles to be produced. The feeder is so adjusted that its travel is substantially equal to the length of the article to be cut or just enough greater than that amount to make certain that the outline of the article cut will be perfect and not marred by a previous cut. The stop 33 serves to locate the strip before the first action thereon by the feeder in such a position that the first operation of the feeder will advance the strip only so far as to carry its forward or advanced end across the nearer side of the cutting die a distance equal to that by which irregularities in the thickness or in the edge line of the piece extend back from such edge, and the described means for adjusting the stop enables the stop to be accurately positioned for this purpose. In other words, the stop arrests the piece when the advancing end thereof has passed beyond the innermost limit of travel of the intermittent feeder a distance about equal to the extent of such irregularity, and before the piece has been engaged by the feeder. In consequence the first action of the die will trim off the irregular edge of the piece, and subsequent cutting actions will produce lifts or other articles of complete outline and uniform character, unmarred by the irregularities which exist in the edge of the piece. The adjustment for the location of the stop and for the extent of throw of the intermittent feeder are independent of one another, whereby the width of the first cut may be made sufficient to cut off the irregular edge and no more of the piece, while subsequent cuts may be made to produce lifts perfect in outline without waste of material between successively cut lifts.

The great advantage which follows from the use of the stop is the saving of material, for the waste which previously occurred by reason of the first article cut from a fresh piece of stock being imperfect and having to be thrown away, is now reduced to merely the width of the uneven edge of the piece, and all of the material of substantially uniform thickness back of such uneven edge is now made available to be cut up into articles sufficiently perfect for the uses of commerce. The stop will arrest the strip shortly before the rear end of the strip passes from the rolls 16 and 17, and such rolls will slip on the strip when so arrested, by reason of the yielding manner in which one or both of the rolls is mounted, the force with which the rolls grip the strip being so limited, although the strip will be fed when not opposed, the force applied will not be great enough to push it past the stop. The feeder 18 is more positive and applies sufficient force to the strip to cause the latter to displace the stop and the retainer, and it engages the strip at a point so near the stop that the intermediate length of the strip has not enough flexibility to buckle.

The terms "length" and "width" heretofore used in connection with the strip, the die, and the article cut from the strip are used with relation to the strip, the term "length" meaning the dimension in the direction in which the strip is fed, and the term "width" meaning the dimension in a direction at right angles to the line of feeding.

It is to be understood that the foregoing description of my invention in connection with the particular machine here shown is not intended as limiting the invention to that particular machine only.

What I claim and desire to secure by Letters Patent is:—

1. In a cutting machine the combination with a cutter, and a feeder constructed and operable to engage a strip of stock at a point near the cutter and to feed the same intermittently across the line of action thereof, of a stop arranged across the line of feed of the stock at a point on the same side of the die as that from which the stock is fed in determined relation to the cutter and to the zone of action of the feeder.

2. In a die cutting machine the combination with a cutter, and a feeder constructed and operable to engage a strip of stock at a point near the cutter and to feed the same intermittently across the line of action of the cutter, of a stop arranged across the line of feed of the stock at a point between the cutter and the feeder and in determined relation to the cutter and to the zone of action of the feeder, said stop being adjustable whereby it may be placed at varying distances from the line of action of the cutter in the line of feeding.

3. In a die cutting machine the combination with a cutter and a feeder constructed and operable to engage a strip of stock at a point near the cutter and to feed the same intermittently across the line of action of the cutter, of a stop arranged across the line of feed of the stock at a point between the cutter and the advancing end of the stock, in determined relation to the cutter and to the zone of action of the feeder, and means for adjusting said stop toward and away from the line of action of the cutter.

4. In a die cutting machine, the combination with a die and a complemental cutting block, one of which is moved reciprocatively toward and away from the other, of a reciprocating feeder movable transversely to the direction of cutting action of the die and toward and away from the latter, and a stop mounted across the path in which the work travels when approaching the die, said stop being yieldingly mounted and constructed to be displaced by the pressure of the advancing work.

5. In a dieing out machine, the combination with a cutting block and a die which is movable toward and away from the block, of a work support, a reciprocating feeder traveling toward and away from the line of movement of the die, and a stop holder extending from said work support toward the line of action of the die and arranged relatively to the cutting block to provide a channel between itself and the block for the material acted upon, said holder having a stop crossing such channel.

6. In a dieing out machine, the combination with a cutting block and a die which is movable toward and away from the block, of a work support, a reciprocating feeder traveling toward and away from the line of movement of the die, and a stop holder extending from said work support toward the line of action of the die and arranged relatively to the cutting block to provide a channel between itself and the block for the material acted upon, said holder having a stop crossing such channel, the stop being inclined convergently toward the direction of feeding of the material, and the stop holder being resilient and yielding, whereby the pressure of the advancing material is enabled to displace the stop from the path of the work.

7. In a dieing out machine, a cutting block, a cutting die movable toward and away from said block, a work support at one side of the line of action of said die, an intermittent feeding member movable back and forth between said work support and said die, a stop holder crossing the work support and extending therefrom toward the die and separated from the cutting block sufficiently to provide a channel through which the work may pass across the face of said block, a stop extending from said holder toward the block, and a carriage to which said holder is connected movable toward and away from the die.

8. In a dieing out machine, the combination with a coöperating relatively reciprocative die and cutting block of an intermittently acting feeder for placing material between the die and cutting block between successive cutting operations thereof, and a contrivance arranged to arrest a fresh piece of stock about to be operated upon in such a location with respect to the die, and at the side thereof from which the feed of stock takes place, that the first feeding action of said feeding means will carry the forward end of the stock less than far enough to insure cutting of a perfect article, but far enough to cause cutting off of the uneven forward edge of such stock.

9. In a dieing out machine, the combination with a coöperating relatively reciprocative die and cutting block, of a primary feeder for bringing a piece of stock toward the location of said die, a secondary feeder into the zone of action of which the piece is brought by the primary feeder, constructed, arranged, and operating to project the piece step by step between the die and cutting block in alternation with the cutting actions of the latter, and a means for arresting the piece fed by the primary feeder, when its advance end is at a point between the limits of travel of the secondary feeder.

10. In a dieing out machine, the combination with a cutting die, its complemental cutting block, and means for moving one of said elements toward and away from the other, of feeding means for propelling a piece of stock at such times as to place successive adjacent points or areas in position to be cut by the die, and a stop or gage arranged at the side of the die from which the stock advances and at such a point in relation to the line of action of the die, and to the range of action of the feeder, as to enable the feeder in its first feeding action upon the piece to propel the forward edge of the piece to a point between the nearest and most remote points in the cutting edge of the die.

11. In a dieing out machine, the combination with a cutting die and the coöperating support for the stock to be cut, of an intermittent work feeder constructed to feed such stock step by step across the cutting line of the die and arranged so that a piece of stock may be advanced into position to be operatively engaged by it, and means for arresting the advancing piece prior to the engagement of said feeder therewith.

12. In a dieing out machine, the combination with a cutting die and the coöperating support for the stock to be cut, of an intermittent work feeder constructed to feed such stock step by step across the cutting line of the die and arranged so that a piece of stock may be advanced into position to be operatively engaged by it, and a displaced stop arranged across the path in which the stock is so advanced, between the advancing piece and the die.

13. In a dieing out machine, the combination with a cutting die and the coöperating support for the stock to be cut, of an intermittent work feeder constructed to feed such stock step by step across the cutting line of the die and arranged so that a piece of stock may be advanced into possition to be operatively engaged by it, and a stop located between the advancing piece and the cutting line of the die adapted to be displaced in such timed relation with the action of the feeder as to cause the first step of the feed imparted thereby to carry the advancing edge of the piece to a point between the nearer and farther sides of the die.

14. In a dieing out machine, the combination with a cutting die and the coöperating support for the stock to be cut, of an intermittent work feeder constructed to feed such stock step by step across the cutting line of the die and arranged so that a piece of stock may be advanced into position to be operatively engaged by it, and a stop arranged between the line of action of the die and the advancing piece to arrest the latter prior to the engagement of the feeder therewith, said stop being displaceable to permit the piece to be fed in a desired relation to the feeder.

15. In a dieing out machine, the combination with a cutting die and the coöperating support for the stock to be cut, of an intermittent work feeder constructed to feed such stock step by step across the cutting line of the die and arranged so that a piece of stock may be advanced into position to be operatively engaged by it, and a stop arranged to arrest the forward end of the advancing piece at a point short of that to which the feeder is adapted to project such end, said stop being displaceable to permit further propulsion of the piece after having been so arrested.

16. In a machine of the character described having a cutting die and a cutting block, an intermittent feeder mounted so that it may move toward and away from the die, said feeder comprising a carrier, a dog pivoted on said carrier and having an arm, and an actuating bar movable back and forth in approximately the feeding direction and connected to said arm, whereby to move the dog bodily and also oscillatively about its pivot.

17. In a machine of the character described, a work support, a carriage located at one side of the space occupied by the work and movable back and forth, a feed dog pivoted on said carriage and movable toward and away from such space, an arm projecting from said dog, and an actuating bar connected to said arm and movable in a line located at the opposite side of the pivot of the dog from the location of the work, whereby movement of said arm is adapted to swing the dog upon its pivot and also to shift the dog and carrier.

18. In a dieing out machine, the combination of a cutting block and a die, a work guiding means, and dogs projecting from the work guiding means toward the die at opposite sides of the latter for locating the material acted upon centrally over the die, said dogs being yieldingly mounted and having beveled faces toward the die, whereby to be spread apart by the die when the latter passes between them.

19. In a dieing out machine, a reciprocating cutting die, a complemental block for holding the work against the thrust of the die, means for guiding work between the die and block, dogs projecting from said guiding means at each side of the path of the stock toward the die, and being mounted to yield outwardly from the die, whereby to so position the material acted upon that the die may act centrally between the edges of the material.

20. In a dieing out machine in combination with a die and a guide plate for guiding material across the cutting end of the die, a retainer extending toward the die at a distance from said plate sufficient to provide a channel for the material, said retainer having its end near the die bent toward said plate and being supported at a point remote from the die and being resilient in construction, and a resilient stop holder extending between said retainer and said plate adjacent to the retainer and having a stop extending toward the plate at a point near the bent up end of the retainer, said retainer and stop being adapted to yield to permit passage of the work between them and the plate.

In testimony whereof I have affixed my signature, in presence of two witnesses.

GEORGE B. GROVER.

Witnesses:
H. ASHBY BOWEN,
WILLIAM J. YOUNG.

Copies of this patent may be obtained for five cents each, by addressing the "Commissioner of Patents, Washington, D. C."